(12) United States Patent
Ito et al.

(10) Patent No.: US 11,465,649 B2
(45) Date of Patent: Oct. 11, 2022

(54) VEHICLE CONTROL SYSTEM, VEHICLE CONTROL DEVICE, AND RECORDING MEDIUM

(71) Applicant: TOYOTA JIDOSHA KABUSHIKI KAISHA, Toyota (JP)

(72) Inventors: Yuki Ito, Iwakura (JP); Tsukasa Nakanishi, Nagoya (JP); Yuta Morikawa, Miyoshi (JP); Naoki Yamamuro, Nagoya (JP); Yuki Tatsumoto, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/923,360

(22) Filed: Jul. 8, 2020

(65) Prior Publication Data
US 2021/0009164 A1 Jan. 14, 2021

(30) Foreign Application Priority Data
Jul. 9, 2019 (JP) .............................. JP2019-127783

(51) Int. Cl.
*B60W 60/00* (2020.01)
*G05D 1/00* (2006.01)

(52) U.S. Cl.
CPC ....... *B60W 60/0027* (2020.02); *G05D 1/0022* (2013.01); *G05D 1/0027* (2013.01); *B60W 2554/802* (2020.02); *B60W 2556/65* (2020.02)

(58) Field of Classification Search
CPC ......... B60W 60/0027; B60W 2556/65; B60W 2554/802; B60W 30/16; B60W 60/005;
(Continued)

(56) References Cited

U.S. PATENT DOCUMENTS 9,964,948 B2    5/2018  Ullrich et al.
2016/0139594 A1* 5/2016  Okumura .............. B60W 30/00
                                                        701/2
(Continued)

FOREIGN PATENT DOCUMENTS

JP      2016-095851 A   5/2016
JP      2016-224477 A   12/2016
(Continued)

*Primary Examiner* — Jess Whittington
*Assistant Examiner* — Brian E Yang
(74) *Attorney, Agent, or Firm* — Oliff PLC

(57) ABSTRACT

A vehicle control system comprising a vehicle control device, and a remote operation terminal. The vehicle control device controls a host vehicle capable of traveling in each of an autonomous self-driving mode, a remote self-driving mode, and a manual driving mode. The remote operation terminal remotely operate the host vehicle. The vehicle control device acquires a nearby-vehicle driving mode representing a driving mode of a nearby vehicle that is a vehicle near the host vehicle. In a case in which the nearby-vehicle driving mode of the nearby vehicle is a remote self-driving mode and a driving mode of the host vehicle is the autonomous self-driving mode, the vehicle control device controls travel of the host vehicle in the autonomous self-driving mode so that a distance between the nearby vehicle and the host vehicle becomes equal to or greater than a predetermined distance.

8 Claims, 6 Drawing Sheets

(58) Field of Classification Search
CPC ......... B60W 60/0016; B60W 60/0017; B60W 60/0013; B60W 30/18; G05D 1/0022; G05D 1/0027; G05D 2201/0213; G05D 1/0289; G05D 1/0038; G05D 1/0061; G05D 1/0088; G08G 1/22; G01S 17/931
See application file for complete search history.

(56) References Cited

U.S. PATENT DOCUMENTS

| | | | |
|---|---|---|---|
| 2018/0056851 A1* | 3/2018 | Kim | G08G 1/161 |
| 2019/0250629 A1* | 8/2019 | Mizuno | B60W 60/001 |
| 2021/0261133 A1* | 8/2021 | Sakayori | B60W 30/18163 |

FOREIGN PATENT DOCUMENTS

| | | |
|---|---|---|
| JP | 2017-030748 A | 2/2017 |
| JP | 2017-037634 A | 2/2017 |

* cited by examiner

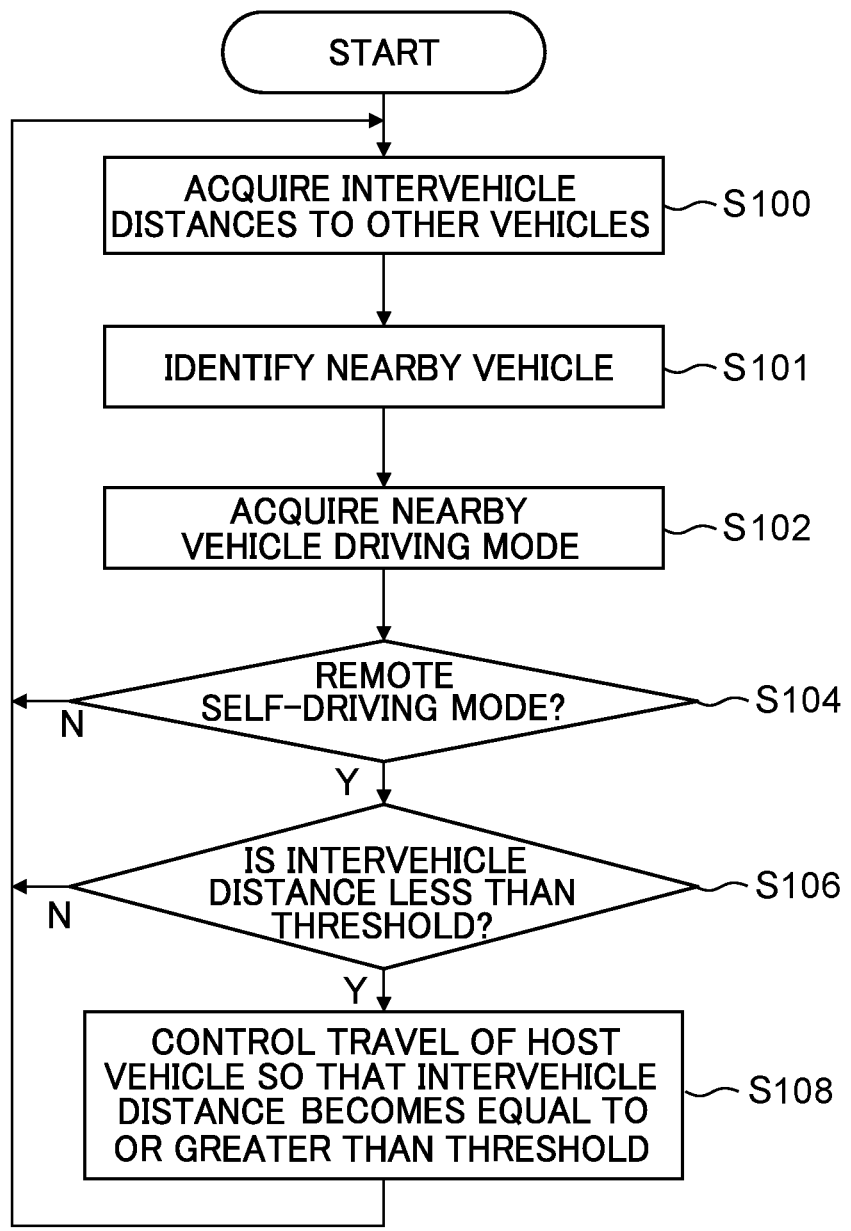

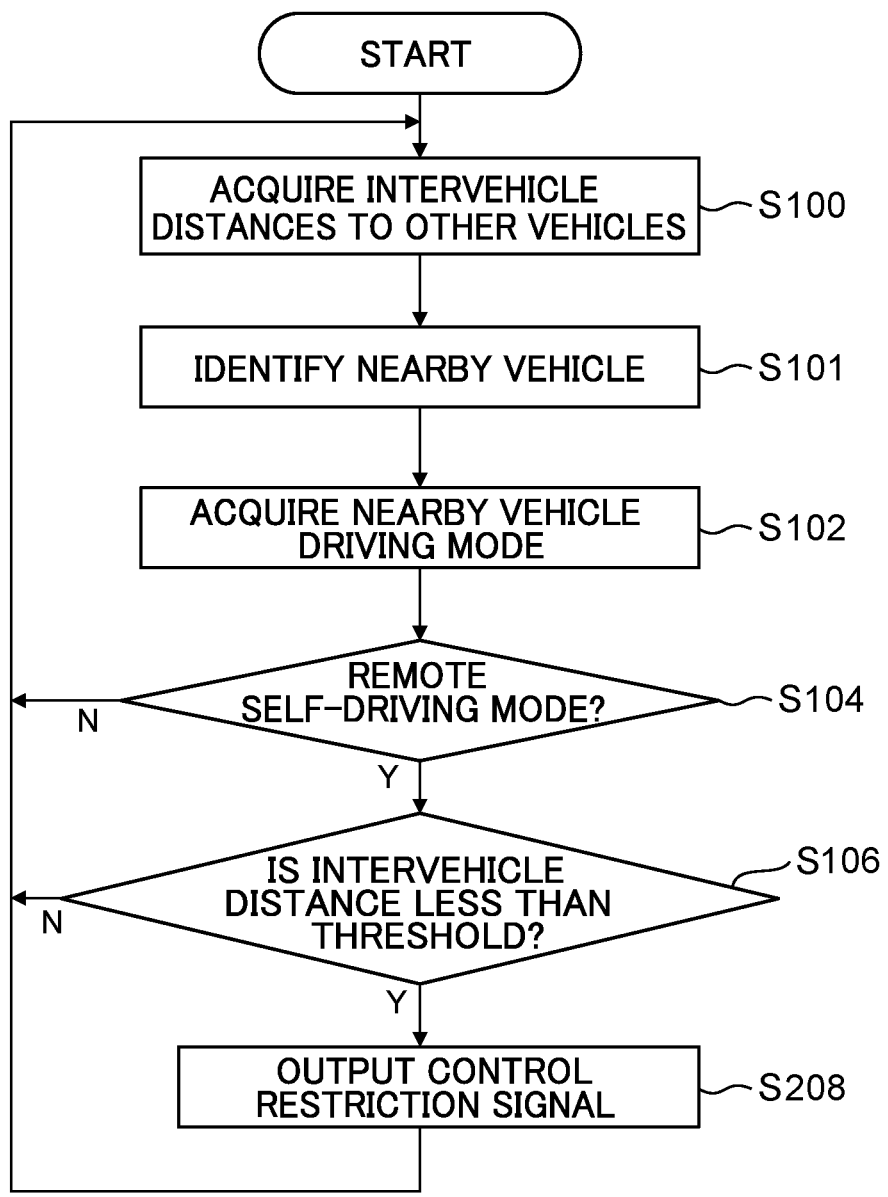

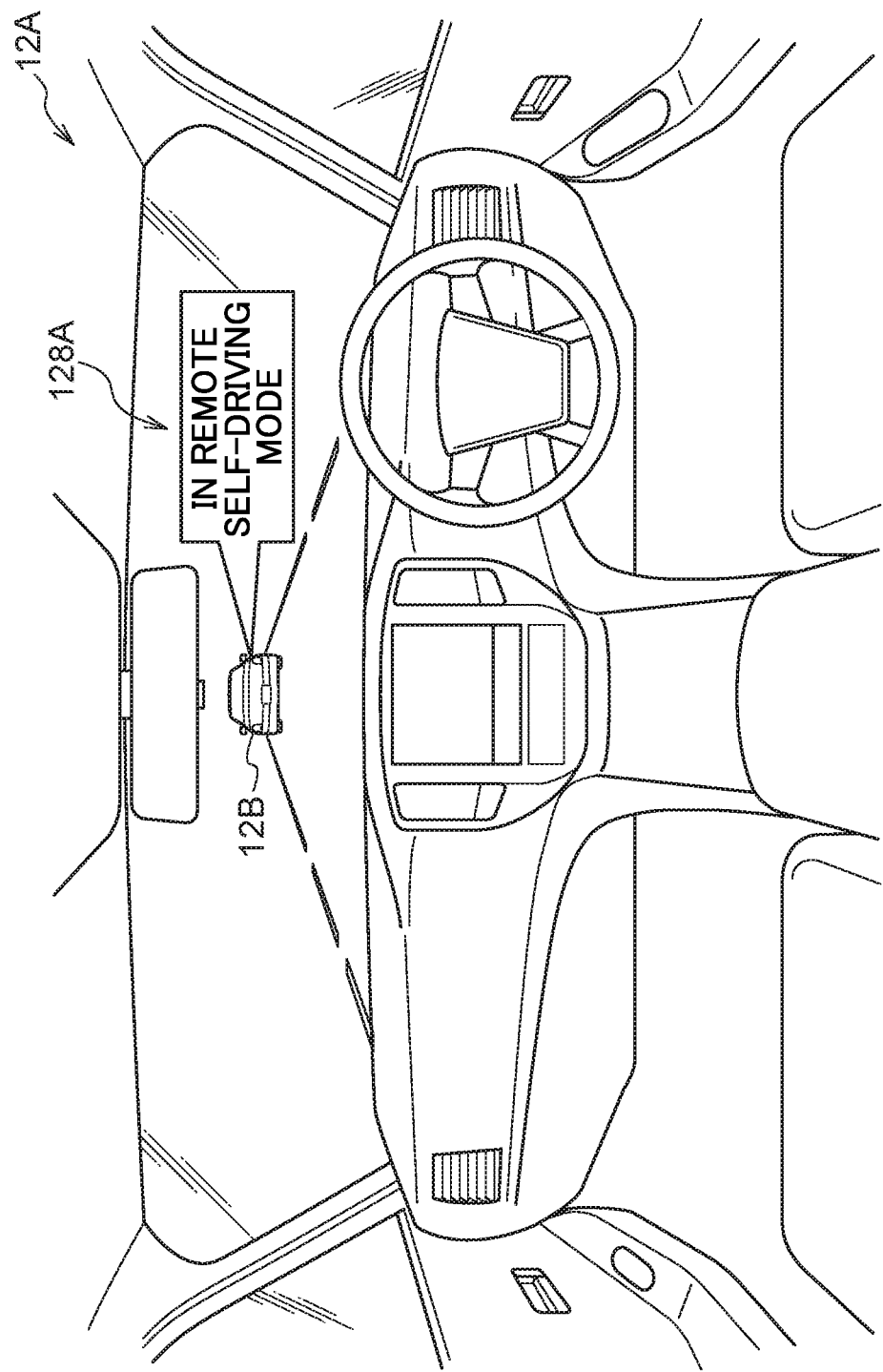

VEHICLE CONTROL SYSTEM, VEHICLE CONTROL DEVICE, AND RECORDING MEDIUM

CROSS-REFERENCE TO RELATED APPLICATION

This application is based on and claims priority under 35 USC 119 from Japanese Patent Application No. 2019-127783 filed on Jul. 9, 2019, the disclosure of which is incorporated by reference herein.

BACKGROUND

Technical Field

The technology of the disclosure relates to a vehicle control system, a vehicle control device, a vehicle control method, and a vehicle control program.

Related Art

U.S. Pat. No. 9,964,948 discloses a system that remotely controls a vehicle.

In this connection, if vehicles traveling by remote control such as disclosed in U.S. Pat. No. 9,964,948 (hereinafter simply called "vehicles traveling in the remote self-driving mode") become widespread, circumstances can arise where there is a mix of vehicles traveling in the remote self-driving mode, vehicles traveling autonomously without reliance upon remote control (hereinafter simply called "vehicles traveling in the autonomous self-driving mode"), and vehicles traveling by manual control by an occupant (hereinafter simply called "vehicles traveling in the manual driving mode").

Under such circumstances, the remote operator who remotely controls the vehicle does not ride in the actual vehicle, so there are cases where the remote operator cannot get a sense of actual intervehicle distances. In this case, circumstances can arise where, for example, a vehicle traveling in the remote self-driving mode and another vehicle end up becoming too close to each other.

U.S. Pat. No. 9,964,948 only discloses remotely controlling autonomous vehicles and does not consider a case where there is a mix of vehicles traveling. For this reason, if the technology disclosed in U.S. Pat. No. 9,964,948 is used, there is the problem that sometimes an appropriate intervehicle distance cannot be maintained between a vehicle in the remote self-driving mode and another vehicle.

SUMMARY

A vehicle control system pertaining to a first aspect includes: a vehicle control device comprising: a first memory, and a first processor coupled to the first memory, the first processor being configured to: control a host vehicle capable of traveling in each of an autonomous self-driving mode, a remote self-driving mode, and a manual driving mode; and a remote operation terminal comprising: a second memory, and a second processor coupled to the second memory, the second processor being configured to remotely operate the host vehicle; wherein the first processor: acquires a nearby-vehicle driving mode representing a driving mode of a nearby vehicle that is a vehicle near the host vehicle, and in a case in which the nearby-vehicle driving mode of the nearby vehicle is a remote self-driving mode and a driving mode of the host vehicle is the autonomous self-driving mode, controls travel of the host vehicle in the autonomous self-driving mode so that a distance between the nearby vehicle and the host vehicle becomes equal to or greater than a predetermined distance.

A vehicle control system pertaining to a second aspect includes: a vehicle control device comprising: a first memory, and a first processor coupled to the first memory, the first processor being configured to: control a host vehicle capable of traveling in each of an autonomous self-driving mode, a remote self-driving mode, and a manual driving mode; and a first remote operation terminal comprising: a second memory, and a second processor coupled to the second memory, the second processor being configured to remotely operate the host vehicle; wherein the first processor: acquires a nearby-vehicle driving mode representing a driving mode of a nearby vehicle that is a vehicle near the host vehicle, and in a case in which the nearby-vehicle driving mode of the nearby vehicle is a remote self-driving mode and a driving mode of the host vehicle is the remote self-driving mode, outputs, to at least one of the first remote operation terminal that operates the host vehicle or a second remote operation terminal that operates the nearby vehicle, a control signal relating to a control restriction whereby a distance between the host vehicle and the nearby vehicle becomes equal to or greater than a predetermined distance, and controls travel of the host vehicle in the remote self-driving mode in accordance with operation information sent from the first remote operation terminal that operates the host vehicle.

BRIEF DESCRIPTION OF THE DRAWINGS

FIG. 4 is a flowchart showing an example of a process performed by an ECU pertaining to the first embodiment;

FIG. 5 is a flowchart showing an example of a process performed by the ECU pertaining to a second embodiment; and FIG. 6 is an explanatory drawing for describing the output of a nearby vehicle driving mode.

DETAILED DESCRIPTION

First Embodiment

A vehicle control system of a first embodiment will be described below using the drawings.

Figure 1:
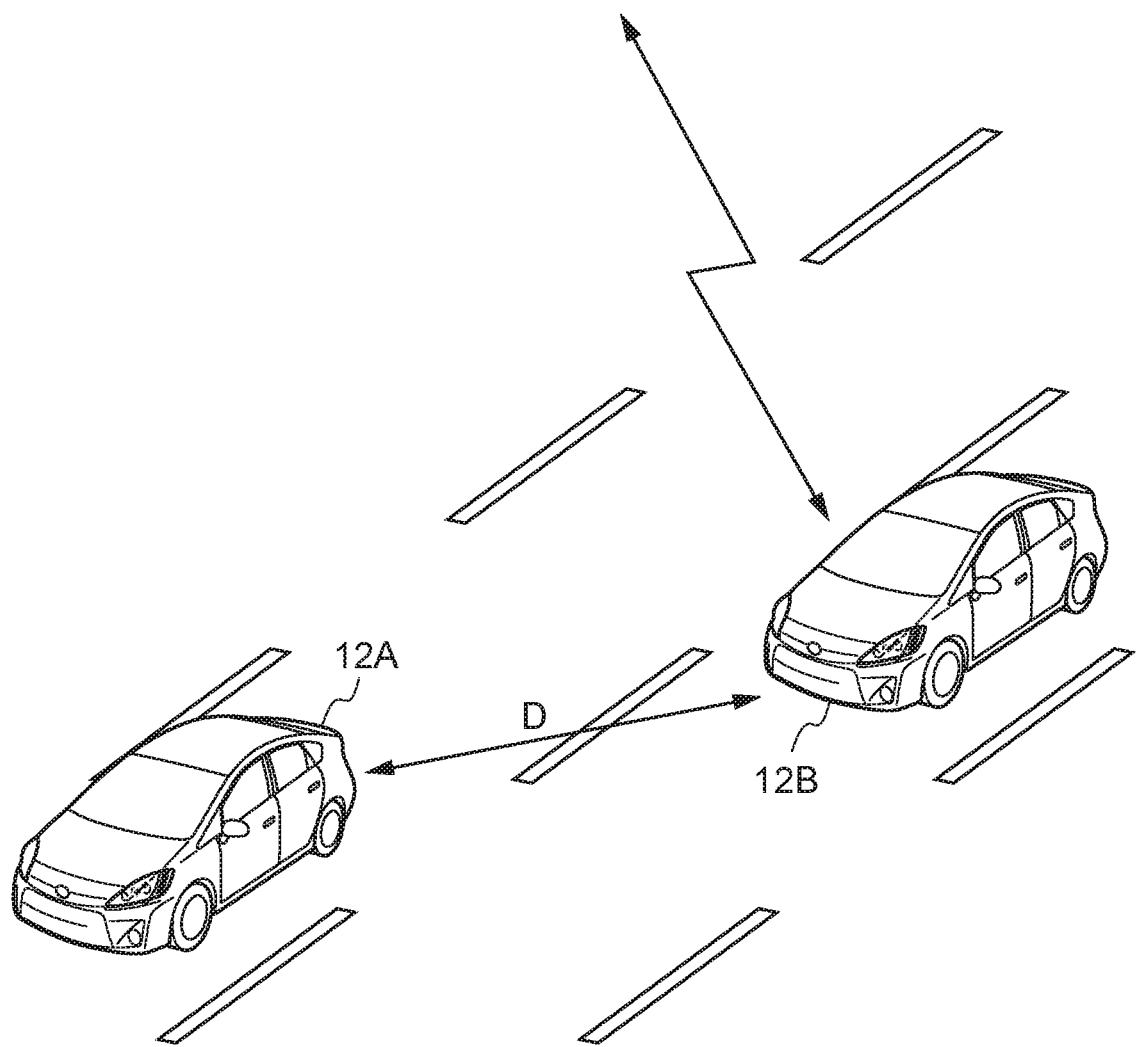
FIG. 1 is an explanatory drawing for describing an overview of a first embodiment.

FIG. 1 is an explanatory drawing for describing an overview of the present embodiment. A scenario will be considered where, as shown in FIG. 1, a host vehicle 12A traveling in an autonomous self-driving mode or a manual driving mode and a nearby vehicle 12B traveling in a remote self-driving mode are traveling on a road.

In this case, as shown in FIG. 1, the nearby vehicle 12B is controlled by a remote operator U. However, the remote operator U is not actually riding in the vehicle, so there are also cases where the remote operator U cannot appropriately get a sense of the intervehicle distance between the nearby vehicle 12B and the host vehicle 12A. In this case, there is the problem that the occupant of the host vehicle 12A and the occupant of the nearby vehicle 12B may feel increasingly uneasy the shorter the intervehicle distance D becomes.

Therefore, the vehicle control system of the present embodiment controls the travel of the host vehicle 12A so that the intervehicle distance between the host vehicle 12A and the nearby vehicle 12B traveling in the remote self-driving mode becomes equal to or greater than a predetermined distance. Because of this, the intervehicle distance between the host vehicle 12A and the nearby vehicle 12B is appropriately maintained, and unease felt by the occupants is eliminated.

This will be specifically described below.

Figure 2:
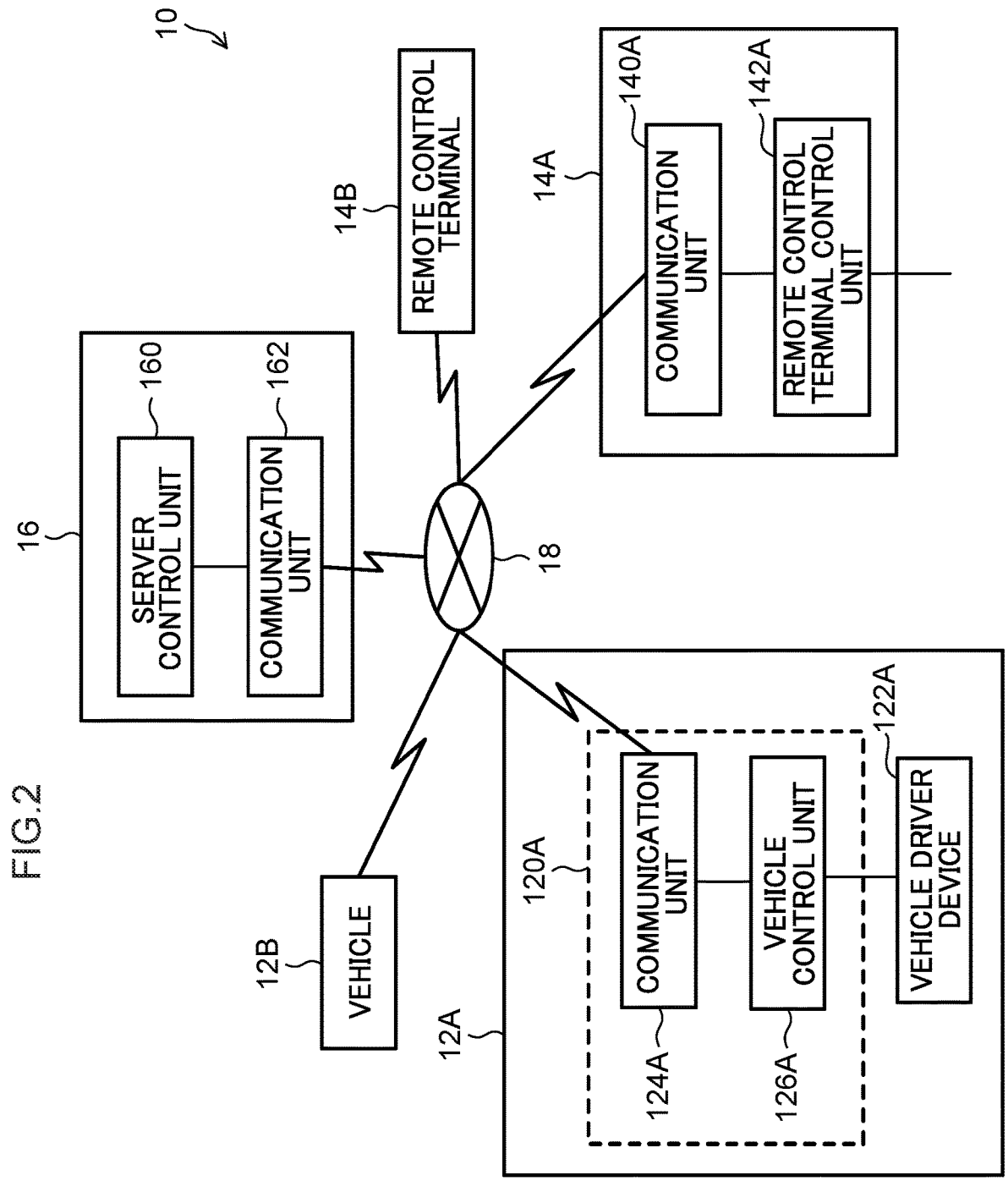
FIG. 2 is a schematic block diagram of a vehicle control system pertaining to the first embodiment.

FIG. 2 is a block diagram showing an example of the configuration of a vehicle control system 10 pertaining to the first embodiment. As shown in FIG. 2, the vehicle control system 10 has plural vehicles 12A, 12B, plural remote operation terminals 14A, 14B, and a server 16. The vehicles 12A, 12B, the remote operation terminals 14A, 14B, and the server 16 are interconnected by predetermined communication means 18. Below, it will be supposed that vehicle 12A is the host vehicle 12A and that vehicle 12B is the nearby vehicle 12B.

(Vehicles)

The vehicles of the present embodiment are vehicles that can travel in an autonomous self-driving mode, a remote self-driving mode, and a manual driving mode. The autonomous self-driving mode is a driving mode in which the vehicle travels autonomously on the basis of information successively detected by various sensors provided in the vehicle. Furthermore, the remote self-driving mode is a driving mode in which the vehicle travels on the basis of control information output from the remote operation terminal. Furthermore, the manual driving mode is a driving mode in which the vehicle is driven by an occupant riding in the vehicle. The driving modes represent types of vehicle travel control.

The configurations of the host vehicle 12A and the nearby vehicle 12B are the same, so just the configuration of the host vehicle 12A will be described below.

The host vehicle 12A has an electronic control unit (ECU) 120A that controls the travel of the vehicle and a vehicle driver device 122A that drives the vehicle in accordance with control signals from the ECU 120A. The ECU 120A is an example of the vehicle control device of the disclosure.

As shown in FIG. 2, the ECU 120A functionally has a communication unit 124A and a vehicle control unit 126A.

The communication unit 124A sends information to and receives information from other devices.

The vehicle control unit 126A acquires control information sent via the server 16 from the remote operation terminal 14A. The control information sent from the remote operation terminal 14A is control information input to the remote operation terminal 14A by a remote operator.

The vehicle control unit 126A also acquires control information input from the occupant riding in the vehicle.

The vehicle control unit 126A also acquires information relating to autonomous travel. Examples of the information relating to autonomous travel include control signals from other ECUs or sensor signals from various sensors (image sensors, laser radar sensors, etc.) installed in the vehicle.

The vehicle control unit 126A controls the driving of the vehicle driver device 122A on the basis of various types of information input from outside. For example, the vehicle control unit 126A switches between the autonomous self-driving mode, the remote self-driving mode, and the manual driving mode on the basis of the various types of information it has acquired.

(Remote Operation Terminals)

The configurations of the remote operation terminal 14A and the remote operation terminal 14B are the same, so just the configuration of the remote operation terminal 14A will be described below.

As shown in FIG. 2, the remote operation terminal 14A functionally has a communication unit 140A and a remote operation terminal control unit 142A.

The communication unit 140A sends information to and receives information from other devices.

The remote operation terminal control unit 142A controls the remote operation terminal 14A. For example, the remote operation terminal control unit 142A controls the communication unit 140A so as to acquire control information input by the remote operator and send the control information to the server 16.

(Server)

As shown in FIG. 2, the server 16 functionally has a server control unit 160 and a communication unit 162.

The server control unit 160 controls the server 16. For example, the server control unit 160 controls the communication unit 162 so as to acquire control information sent from the remote operation terminal 14A and send the control information to the host vehicle 12A.

The communication unit 124A sends information to and receives information from other devices.

Figure 3:
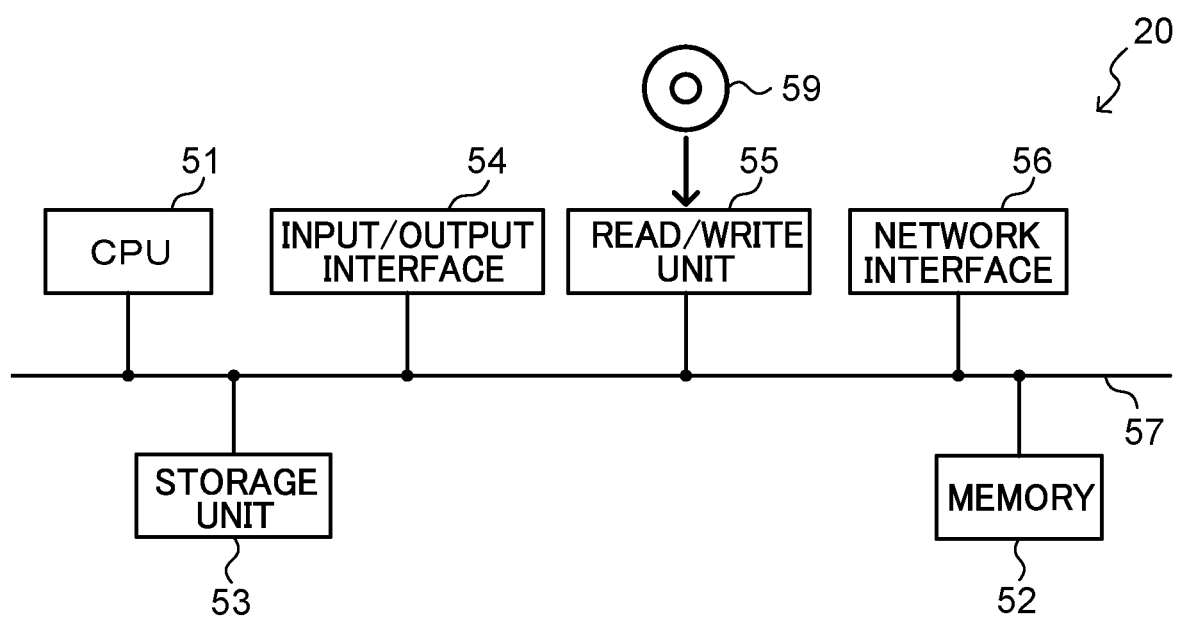
FIG. 3 is a diagram showing an example configuration of a computer of each device configuring the vehicle control system.

The ECUs of the vehicles 12A, 12B, the remote operation terminals 14A, 14B, and the server 16 can be realized by a computer 20 such as shown in FIG. 3. The computer 20 has a CPU 51, a memory 52 serving as a temporary storage area, and a nonvolatile storage unit 53. The computer 20 also has an input/output interface 54 to which an input/output device (not shown in the drawings) is connected and a read/write unit 55 that controls the reading of data from and the writing of data to a recording medium 59. The computer 20 also has a network interface 56 that is connected to a network such as the internet. The CPU 51, the memory 52, the storage unit 53, the input/output interface 54, the read/write unit 55, and the network interface 56 are connected to each other via a bus 57.

The storage unit 53 can be realized by a hard disk drive (HDD), a solid state drive (SSD), or a flash memory. A program for allowing the computer 20 to function is stored in the storage unit 53 serving as a storage medium. The CPU 51 reads the program from the storage unit 53, transfers it to the memory 52, and successively executes processes that the program has.

Next, the action of the vehicle control system 10 of the first embodiment will be described.

In a scenario where plural vehicles are traveling, the host vehicle 12A traveling in the autonomous self-driving mode executes the vehicle control process routine shown in FIG. 4.

In step S100, the ECU 120A of the host vehicle 12A traveling in the autonomous self-driving mode, as the vehicle control unit 126A, acquires the intervehicle distances between the host vehicle 12A and other vehicles. For example, the vehicle control unit 126A acquires the intervehicle distances between the host vehicle 12A and the other vehicles by vehicle-to-vehicle communication with the other vehicles via the communication unit 124A. Furthermore, for example, the vehicle control unit 126A acquires the intervehicle distances between the host vehicle 12A and the other vehicles on the basis of information measured by the laser radar (not shown in the drawings) installed in the host vehicle 12A.

In step S101, the ECU 120A of the host vehicle 12A, as the vehicle control unit 126A, identifies a vehicle whose intervehicle distance is less than a predetermined distance as the nearby vehicle 12B that is a vehicle near the host vehicle 12A.

In step S102, the ECU 120A of the host vehicle 12A, as the vehicle control unit 126A, acquires the nearby vehicle driving mode representing the driving mode of the nearby vehicle 12B identified in step S101.

In step S104, the ECU 120A of the host vehicle 12A, as the vehicle control unit 126A, determines whether or not the nearby vehicle driving mode acquired in step S102 is the remote self-driving mode. In a case where the nearby vehicle driving mode of the nearby vehicle 12B is the remote self-driving mode, the ECU 120A of the host vehicle 12A proceeds to step S106. On the other hand, in a case where the nearby vehicle driving mode of the nearby vehicle 12B is not the remote self-driving mode, the ECU 120A of the host vehicle 12A returns to step S100.

In step S106, the ECU 120A of the host vehicle 12A, as the vehicle control unit 126A, determines whether or not the intervehicle distance between the nearby vehicle 12B identified in step S101 and the host vehicle 12A is less than a predetermined distance (For example, the threshold.). In a case where the intervehicle distance between the nearby vehicle 12B and the host vehicle 12A is less than the predetermined distance, the ECU 120A of the host vehicle 12A proceeds to step S108. On the other hand, in a case where the intervehicle distance between the nearby vehicle 12B and the host vehicle 12A is equal to or greater than the predetermined distance, the ECU 120A of the host vehicle 12A returns to step S100.

In step S108, the ECU 120A of the host vehicle 12A, as the vehicle control unit 126A, controls the travel of the host vehicle in the autonomous self-driving mode so that the intervehicle distance between the nearby vehicle 12B identified in step S101 and the host vehicle 12A becomes equal to or greater than the predetermined distance.

Specifically, for example, in a case where the intervehicle distance between a vehicle in back identified as the nearby vehicle 12B and the host vehicle 12A is less than the predetermined distance, the vehicle control unit 126A controls the vehicle driver device 122A to accelerate the host vehicle 12A. Because of this, the intervehicle distance between the host vehicle 12A and the vehicle in back becomes equal to or greater than the predetermined distance. Furthermore, for example, in a case where the intervehicle distance between a vehicle in front identified as the nearby vehicle 12B and the host vehicle 12A is less than the predetermined distance, the vehicle control unit 126A controls the vehicle driver device 122A to decelerate the host vehicle 12A. Because of this, the intervehicle distance between the host vehicle 12A and the vehicle in front becomes equal to or greater than the predetermined distance.

The processes of step S100 to step S108 are repeatedly executed when the host vehicle 12A is traveling in the autonomous self-driving mode. Because of this, the intervehicle distance between the nearby vehicle 12B traveling in the remote self-driving mode and the host vehicle 12A becomes equal to or greater than the predetermined distance. For this reason, the intervehicle distance between the host vehicle 12A and the nearby vehicle 12B does not become too short, and unease felt by the occupant of the host vehicle 12A and the occupant of the nearby vehicle 12B is eliminated.

As described above, the vehicle control system 10 pertaining to the first embodiment has an ECU, which controls a vehicle capable of traveling in an autonomous self-driving mode, a remote self-driving mode, and a manual driving mode, and a remote operation terminal, which remotely controls the vehicle, wherein the ECU acquires a nearby vehicle driving mode representing the driving mode of a nearby vehicle that is a vehicle near the host vehicle. In a case where the nearby vehicle driving mode is the remote self-driving mode and the host vehicle is in the autonomous self-driving mode, the ECU controls the host vehicle in the autonomous self-driving mode so that the distance between the nearby vehicle and the host vehicle becomes equal to or greater than a predetermined distance. Because of this, when a vehicle in the remote self-driving mode is traveling on a road, the intervehicle distance can be appropriately maintained. Specifically, an appropriate intervehicle distance is maintained between the host vehicle and the nearby vehicle. Furthermore, because an appropriate intervehicle distance is maintained, unease felt by the occupant of the host vehicle and the occupant of the nearby vehicle is eliminated, and the occupants can ride with ease.

Second Embodiment

Next, a vehicle control system pertaining to a second embodiment will be described. The configuration of the vehicle control system pertaining to the second embodiment is the same as that of the first embodiment, so the same reference signs are assigned thereto and description thereof will be omitted.

The vehicle control system 10 of the second embodiment differs from the vehicle control system 10 of the first embodiment in that, in a case where the host vehicle 12A is traveling in the remote self-driving mode and the nearby vehicle 12B traveling in the remote self-driving mode is coming closer to the host vehicle 12A, the ECU 120A of the host vehicle 12A outputs a control signal relating to a control restriction to the remote operation terminal 14A that remotely controls the host vehicle 12A.

In a case where the host vehicle 12A is traveling in the autonomous self-driving mode, the travel of the vehicle can be controlled by the ECU 120A installed in the host vehicle 12A. For this reason, in a case where the distance between the host vehicle 12A in the autonomous self-driving mode and the nearby vehicle 12B in the remote self-driving mode is less than the predetermined distance and the host vehicle 12A and the nearby vehicle 12B are coming closer to each other, the ECU 120A can control the travel of the host vehicle 12A so as to increase its distance from the nearby vehicle 12B.

On the other hand, in a case where the host vehicle 12A is in the remote self-driving mode, the travel of the host vehicle 12A is controlled by the remote operation terminal 14A. For this reason, the ECU 120A cannot directly control the travel of the host vehicle 12A.

Therefore, the vehicle control system of the second embodiment outputs a control signal relating to a control restriction (hereinafter this signal will be simply called "the control restriction signal") to the remote operation terminal 14A that remotely controls the host vehicle 12A. The control restriction signal is a control restriction signal whereby the distance between the host vehicle 12A and the nearby vehicle 12B becomes equal to or greater than the predetermined distance. The remote operation terminal 14A receiving the control restriction signal has a control restriction placed on its control of the host vehicle 12A so that it is restricted from performing control that brings the host vehicle 12A even closer to the nearby vehicle 12B that is close to it. Because of this, even in a case where the host vehicle 12A is traveling in the remote self-driving mode, the intervehicle distance between the host vehicle 12A and the nearby vehicle 12B is appropriately maintained.

Next, the action of the vehicle control system 10 of the second embodiment will be described.

In a scenario where plural vehicles are traveling, the host vehicle 12A travels in the remote self-driving mode on the basis of control information output from the remote operation terminal 14A. At this time, the ECU 120A of the host vehicle 12A executes the vehicle control process routine shown in FIG. 5.

The processes of step S100 to step S106 are executed in the same way as in the first embodiment.

In step S208, the ECU 120A of the host vehicle 12A, as the vehicle control unit 126A, outputs, to the remote operation terminal 14A that controls the host vehicle 12A, the control restriction signal whereby the distance between the host vehicle 12A and the nearby vehicle 12B identified in step S101 becomes equal to or greater than the predetermined distance.

The remote operation terminal 14A receiving the control restriction signal has a control restriction placed on its control of the host vehicle 12A so that it is restricted from performing control that brings the host vehicle 12A even closer to the nearby vehicle 12B that is close to it.

For example, in a case where the intervehicle distance between a vehicle in back identified as the nearby vehicle 12B and the host vehicle 12A is less than the predetermined distance, the remote operation terminal 14A is restricted from performing remote control that decelerates the host vehicle 12A. Because of this, the intervehicle distance between the host vehicle and the vehicle in back becomes equal to or greater than the predetermined distance.

Furthermore, for example, in a case where the intervehicle distance between a vehicle in front identified as the nearby vehicle 12B and the host vehicle 12A is less than the predetermined distance, the remote operation terminal 14A is restricted from performing remote control that accelerates the host vehicle 12A. Because of this, the intervehicle distance between the host vehicle 12A and the vehicle in front becomes equal to or greater than the predetermined distance.

The ECU 120A of the host vehicle 12A, as the communication unit 124A, receives control information sent from the remote operation terminal 14A that controls the host vehicle 12A. The ECU 120A of the host vehicle 12A, as the vehicle control unit 126A, controls the travel of the host vehicle 12A in the remote self-driving mode in accordance with the control information it has received.

The processes of step S100 to step S208 are repeatedly executed when the host vehicle 12A is traveling in the remote self-driving mode. Because of this, the intervehicle distance between the nearby vehicle 12B traveling in the remote self-driving mode and the host vehicle 12A becomes equal to or greater than the predetermined distance. For this reason, the intervehicle distance between the host vehicle 12A and the nearby vehicle 12B does not become too short, and unease felt by the occupant of the host vehicle 12A and the occupant of the nearby vehicle 12B is eliminated.

Other configurations and action of the vehicle control system 10 pertaining to the second embodiment are the same as those of the first embodiment, so description thereof will be omitted.

As described above, the vehicle control system 10 pertaining to the second embodiment has a vehicle control device, which controls a vehicle capable of traveling in an autonomous self-driving mode, a remote self-driving mode, and a manual driving mode, and a remote operation terminal, which remotely controls the vehicle, wherein the ECU acquires a nearby vehicle driving mode representing the driving mode of a nearby vehicle that is a vehicle near the host vehicle. In a case where the nearby vehicle driving mode is the remote self-driving mode and the host vehicle is in the remote self-driving mode, the ECU outputs, to the remote operation terminal that controls the host vehicle, a control restriction signal whereby the distance between the host vehicle and the nearby vehicle becomes equal to or greater than a predetermined distance. The ECU controls the host vehicle in the remote self-driving mode in accordance with control information sent from the remote operation terminal that controls the host vehicle. Because of this, even in a case where the host vehicle 12A is traveling in the remote self-driving mode, the intervehicle distance between the host vehicle 12A and the nearby vehicle 12B is appropriately maintained.

Third Embodiment

Next, a vehicle control system pertaining to a third embodiment will be described. Regarding parts having the same configuration as those of the first embodiment, the same reference signs are assigned thereto and description thereof will be omitted.

The vehicle control system of the third embodiment differs from the vehicle control systems of the first embodiment and the second embodiment in that, in a case where the nearby vehicle 12B is traveling in the remote self-driving mode, the ECU 120A of the host vehicle 12A causes information indicating that the driving mode of the nearby vehicle 12B is the remote self-driving mode to be output from an output device in the host vehicle 12A.

In a case where there is a mix of vehicles in various driving modes traveling on a road, sometimes the occupant of the host vehicle 12A may become uneasy if it is unclear in what driving mode the nearby vehicle 12B is traveling.

Therefore, the ECU 120A of the third embodiment controls so as to cause information indicating the nearby vehicle driving mode of the nearby vehicle 12B to be output from an output device in the host vehicle 12A. For example, in a case where the nearby vehicle 12B is traveling in the remote self-driving mode, the ECU 120A of the third embodiment controls so as to cause information indicating that the driving mode of the nearby vehicle 12B is the remote self-driving mode to be output from the output device in the host vehicle 12A.

FIG. 6 is an explanatory drawing for describing the output of the nearby vehicle driving mode. As shown in FIG. 6, for example, in a case where a vehicle in front that is the nearby vehicle 12B is traveling in the remote self-driving mode, the ECU 120A causes an output device in the host vehicle 12A to output information indicating that the vehicle in front is in the remote self-driving mode ("The vehicle in front is in the remote self-driving mode"). In the example shown in FIG. 6, a display 128A that is an example of the output device is disposed in the front glass, and information indicating that the vehicle in front that is the nearby vehicle 12B is in the remote self-driving mode ("In remote self-driving mode") is output on the display 128A. As the nearby vehicle driving mode, information indicating that the nearby vehicle 12B is in the autonomous self-driving mode or the manual driving mode may also be output.

Because of this, the occupant of the host vehicle 12A can know the driving mode in which the nearby vehicle 12B is traveling, and unease felt by the occupant is eliminated.

The information indicating that the nearby vehicle 12B is in the remote self-driving mode may also be audio information. In this case, the information indicating that the nearby vehicle 12B is in the remote self-driving mode ("The vehicle in front is in the remote self-driving mode") is output from a speaker that is an example of the output device in the host vehicle 12A.

As described above, in a case where the driving mode of the nearby vehicle 12B is the remote self-driving mode, the vehicle control system 10 pertaining to the third embodiment controls so as to cause information indicating that the driving mode of the nearby vehicle 12B is the remote self-driving mode to be output from an output device in the host vehicle 12A. Because of this, the occupant of the host vehicle 12A can know the driving mode of the nearby vehicle 12B.

The processes performed by the devices in the above embodiments have been described as software processes performed by executing a program, but the processes may also be processes performed by hardware. Alternatively, the processes may also be processes combining both software and hardware. Furthermore, the program stored in the ROM may also be stored in various types of storage media and distributed.

Moreover, the technology of the disclosure is not intended to be limited by the above description and can, in addition to what is described above, of course be modified in various ways and implemented in a range that does not depart from the spirit thereof.

For example, in the second embodiment, a case where the vehicle control system 10 outputs the control restriction signal to the remote operation terminal 14A that controls the host vehicle 12A was described as an example, but the vehicle control system 10 of the second embodiment is not limited to this. For example, the vehicle control system 10 may also be configured to output the control restriction signal to the remote operation terminal 14B that controls the nearby vehicle 12B. In this case, the control information sent from the remote operation terminal 14B to the nearby vehicle 12B becomes restricted. For example, in a case where the host vehicle 12A is positioned in back of the nearby vehicle 12B, the remote operation terminal 14B is restricted from performing remote control that decelerates the nearby vehicle 12B. Furthermore, for example, in a case where the host vehicle 12A is positioned in front of the nearby vehicle 12B, the remote operation terminal 14B is restricted from performing remote control that accelerates the nearby vehicle 12B. For this reason, travel whereby the nearby vehicle 12B moves closer to the host vehicle 12A is restricted, and the intervehicle distance between the host vehicle 12A and the vehicle in front becomes equal to or greater than the predetermined distance. Because of this, the intervehicle distance between the host vehicle 12A and the nearby vehicle 12B is appropriately maintained.

An object of the technology of the disclosure to provide a vehicle control system, a vehicle control device, a vehicle control method, and a vehicle control program that can appropriately maintain the intervehicle distance between a vehicle in the remote self-driving mode and a host vehicle.

A vehicle control system pertaining to a first aspect includes: a vehicle control device that controls a vehicle capable of traveling in an autonomous self-driving mode, a remote self-driving mode, and a manual driving mode; and a remote control terminal that remotely controls the vehicle, wherein the vehicle control device acquires a nearby vehicle driving mode representing the driving mode of a nearby vehicle that is a vehicle near the host vehicle and, in a case where the nearby vehicle driving mode of the nearby vehicle is the remote self-driving mode and the driving mode of the host vehicle is the autonomous self-driving mode, controls the travel of the host vehicle in the autonomous self-driving mode so that the distance between the nearby vehicle and the host vehicle becomes equal to or greater than a predetermined distance.

The vehicle control device of the vehicle control system pertaining to the first aspect acquires the nearby vehicle driving mode representing the driving mode of the nearby vehicle that is a vehicle near the host vehicle and, in a case where the nearby vehicle driving mode of the nearby vehicle is the remote self-driving mode and the driving mode of the host vehicle is the autonomous self-driving mode, controls the travel of the host vehicle in the autonomous self-driving mode so that the distance between the nearby vehicle and the host vehicle becomes equal to or greater than the predetermined distance. Because of this, the intervehicle distance between the nearby vehicle in the remote self-driving mode and the host vehicle can be appropriately maintained. More specifically, the intervehicle distance between the nearby vehicle in the remote self-driving mode and the host vehicle in the autonomous self-driving mode can be appropriately maintained. Because of this, unease felt by occupants is eliminated.

The driving modes represent types of vehicle travel control and include an autonomous self-driving mode, a remote self-driving mode, and a manual driving mode. The autonomous self-driving mode is a driving mode in which the vehicle travels autonomously on the basis of information successively detected by various sensors provided in the vehicle. Furthermore, the remote self-driving mode is a driving mode in which the vehicle travels on the basis of control information output from a remote operation terminal. Furthermore, the manual driving mode is a driving mode in which the vehicle is driven by an occupant riding in the vehicle. Furthermore, the nearby vehicle is a vehicle whose distance to the host vehicle is less than a predetermined distance.

A vehicle control device of a vehicle control system pertaining to a second aspect acquires a nearby vehicle driving mode representing the driving mode of a nearby vehicle that is a vehicle near the host vehicle and, in a case where the nearby vehicle driving mode of the nearby vehicle is the remote self-driving mode and the driving mode of the host vehicle is the remote self-driving mode, outputs, to at least one of the remote operation terminal that controls the host vehicle and the remote operation terminal that controls the nearby vehicle, a control signal relating to a control restriction whereby the distance between the host vehicle and the nearby vehicle becomes equal to or greater than a predetermined distance, and controls the travel of the host vehicle in the remote self-driving mode in accordance with control information sent from the remote operation terminal that controls the host vehicle. Because of this, the intervehicle distance between the nearby vehicle in the remote self-driving mode and the host vehicle can be appropriately maintained. More specifically, the intervehicle distance between the nearby vehicle in the remote self-driving mode and the host vehicle in the remote self-driving mode can be appropriately maintained. Because of this, unease felt by occupants is eliminated.

The vehicle control device pertaining to a third aspect can control so as to cause information indicating the nearby vehicle driving mode of the nearby vehicle to be output from an output device in the host vehicle. Because of this, the occupant of the host vehicle can know the driving mode in which the nearby vehicle is traveling.

A vehicle control device pertaining to a fourth aspect controls a host vehicle capable of traveling in an autonomous self-driving mode, a remote self-driving mode, and a manual driving mode, wherein the vehicle control device acquires a nearby vehicle driving mode representing the driving mode of a nearby vehicle that is a vehicle near the host vehicle and, in a case where the nearby vehicle driving mode of the nearby vehicle is the remote self-driving mode and the driving mode of the host vehicle is the autonomous self-driving mode, controls the travel of the host vehicle in the autonomous self-driving mode so that the distance between the nearby vehicle and the host vehicle becomes equal to or greater than a predetermined distance.

A vehicle control device pertaining to a fifth aspect controls a vehicle capable of traveling in an autonomous self-driving mode, a remote self-driving mode, and a manual driving mode, wherein the vehicle control device acquires a nearby vehicle driving mode representing the driving mode of a nearby vehicle that is a vehicle near the host vehicle and, in a case where the nearby vehicle driving mode of the nearby vehicle is the remote self-driving mode and the host vehicle is in the remote self-driving mode, outputs, to at least one of a remote operation terminal that controls the host vehicle and a remote operation terminal that controls the nearby vehicle, a control signal relating to a control restriction whereby the distance between the host vehicle and the nearby vehicle becomes equal to or greater than a predetermined distance, and controls the travel of the host vehicle in the remote self-driving mode in accordance with control information sent from the remote operation terminal that controls the host vehicle.

A vehicle control method pertaining to a sixth aspect is a vehicle control method in a vehicle control device that controls a vehicle capable of traveling in an autonomous self-driving mode, a remote self-driving mode, and a manual driving mode, wherein the vehicle control device acquires a nearby vehicle driving mode representing the driving mode of a nearby vehicle that is a vehicle near the host vehicle and, in a case where the nearby vehicle driving mode of the nearby vehicle is the remote self-driving mode and the host vehicle is in the autonomous self-driving mode, the vehicle control device controls the travel of the host vehicle in the autonomous self-driving mode so that the distance between the nearby vehicle and the host vehicle becomes equal to or greater than a predetermined distance.

A vehicle control method pertaining to a seventh aspect is a vehicle control method in a vehicle control device that controls a vehicle capable of traveling in an autonomous self-driving mode, a remote self-driving mode, and a manual driving mode, wherein the vehicle control device acquires a nearby vehicle driving mode representing the driving mode of a nearby vehicle that is a vehicle near the host vehicle and, in a case where the nearby vehicle driving mode of the nearby vehicle is the remote self-driving mode and the host vehicle is in the remote self-driving mode, the vehicle control device outputs, to at least one of a remote operation terminal that controls the host vehicle and a remote operation terminal that controls the nearby vehicle, a control signal relating to a control restriction whereby the distance between the host vehicle and the nearby vehicle becomes equal to or greater than a predetermined distance, and controls the travel of the host vehicle in the remote self-driving mode in accordance with control information sent from the remote operation terminal that controls the host vehicle.

A vehicle control program pertaining to an eighth aspect controls a vehicle capable of traveling in an autonomous self-driving mode, a remote self-driving mode, and a manual driving mode, the vehicle control program causing a computer to execute a process including acquiring a nearby vehicle driving mode representing the driving mode of a nearby vehicle that is a vehicle near the host vehicle and, in a case where the nearby vehicle driving mode of the nearby vehicle is the remote self-driving mode and the host vehicle is in the autonomous self-driving mode, controlling the travel of the host vehicle in the autonomous self-driving mode so that the distance between the nearby vehicle and the host vehicle becomes equal to or greater than a predetermined distance.

A vehicle control program pertaining to a ninth aspect controls a vehicle capable of traveling in an autonomous self-driving mode, a remote self-driving mode, and a manual driving mode, the vehicle control program causing a computer to execute a process including acquiring a nearby vehicle driving mode representing the driving mode of a nearby vehicle that is a vehicle near the host vehicle and, in a case where the nearby vehicle driving mode of the nearby vehicle is the remote self-driving mode and the host vehicle is in the remote self-driving mode, outputting, to at least one of a remote operation terminal that controls the host vehicle and a remote operation terminal that controls the nearby vehicle, a control signal relating to a control restriction whereby the distance between the host vehicle and the nearby vehicle becomes equal to or greater than a predetermined distance, and controlling the travel of the host vehicle in the remote self-driving mode in accordance with control information sent from the remote operation terminal that controls the host vehicle.

As described above, according to the technology of the disclosure, the technology of the disclosure has the advantageous effect that it can appropriately maintain the intervehicle distance between a vehicle in the remote self-driving mode and a host vehicle.

What is claimed is:

1. A vehicle control system comprising:
   a vehicle control device including:
      a first memory, and
      a first processor coupled to the first memory, the first processor being configured to control a host vehicle configured to travel in each of an autonomous self-driving mode, a remote self-driving mode, and a manual driving mode; and
   a remote operation terminal including:
      a second memory, and
      a second processor coupled to the second memory, the second processor being configured to remotely operate the host vehicle, wherein
      the first processor:
         acquires a nearby-vehicle driving mode representing a driving mode of a nearby vehicle that is a vehicle near the host vehicle, and
         in a case in which nearby vehicle is in front of the host vehicle, in response to determining that the nearby-vehicle driving mode of the nearby vehicle is the remote self-driving mode and a driving mode of the host vehicle is the autonomous self-driving mode, controls travel of the host vehicle in the autonomous self-driving mode to decelerate the host vehicle when a distance between the nearby vehicle and the host vehicle is less than a predetermined distance, and in a case in which the nearby vehicle is behind the host vehicle, in response to determining that the nearby-vehicle driving mode of the nearby vehicle is the remote self-driving mode and the driving mode of the host vehicle is the autonomous self-driving mode, controls travel of the host vehicle in the autonomous self-driving mode to accelerate when the distance between the nearby vehicle and the host vehicle is less than the predetermined distance.

2. A vehicle control system comprising:
a vehicle control device including:
  a first memory, and
  a first processor coupled to the first memory, the first processor being configured to control a host vehicle configured to travel in each of an autonomous self-driving mode, a remote self-driving mode, and a manual driving mode; and
a first remote operation terminal including:
  a second memory, and
  a second processor coupled to the second memory, the second processor being configured to remotely operate the host vehicle, wherein
  the first processor:
    acquires a nearby-vehicle driving mode representing a driving mode of a nearby vehicle that is a vehicle near the host vehicle, and
    in a case in which the nearby vehicle is in front of the host vehicle, in response to determining that the nearby-vehicle driving mode of the nearby vehicle is the remote self-driving mode and a driving mode of the host vehicle is the remote self-driving mode, outputs, to at least the first remote operation terminal that is configured to operate the host vehicle, a first control signal relating to a first control restriction that restricts the first remote operation terminal from remotely operating to bring the host vehicle closer to the nearby vehicle when a distance between the host vehicle and the nearby vehicle is less than a predetermined distance, and
    in a case in which the nearby vehicle is behind the host vehicle, in response to determining that the nearby-vehicle driving mode of the nearby vehicle is the remote self-driving mode and a driving mode of the host vehicle is the remote self-driving mode, outputs, to at least the first remote operation terminal that is configured to operate the host vehicle, a second control signal relating to a second control restriction that restricts the first remote operation terminal from remotely operating to decelerate the host vehicle when a distance between the host vehicle and the nearby vehicle is less than the predetermined distance.

3. The vehicle control system according to claim 1, wherein the first processor causes information indicating the nearby-vehicle driving mode of the nearby vehicle to be output from an output device in the host vehicle.

4. The vehicle control system according to claim 2, wherein the first processor causes information indicating the nearby-vehicle driving mode of the nearby vehicle to be output from an output device in the host vehicle.

5. A vehicle control device comprising:
a memory; and
a processor coupled to the memory, the processor being configured to: control a host vehicle capable of traveling in each of an autonomous self-driving mode, a remote self-driving mode, and a manual driving mode, wherein
  the processor:
    acquires a nearby-vehicle driving mode representing a driving mode of a nearby vehicle that is a vehicle near the host vehicle, and
    in a case in which the nearby vehicle is in front of the host vehicle, in response to determining that the nearby-vehicle driving mode of the nearby vehicle is the remote self-driving mode and a driving mode of the host vehicle is the autonomous self-driving mode, controls travel of the host vehicle in the autonomous self-driving mode to decelerate when a distance between the nearby vehicle and the host vehicle is less than a predetermined distance, and
    in a case in which the nearby vehicle is behind the host vehicle, in response to determining that the nearby-vehicle driving mode of the nearby vehicle is the remote self-driving mode and the driving mode of the host vehicle is the autonomous self-driving mode, controls travel of the host vehicle in the autonomous self-driving mode to accelerate when the distance between the nearby vehicle and the host vehicle is less than the predetermined distance.

6. A vehicle control device comprising:
a memory; and
a processor coupled to the memory, the processor being configured to: control a host vehicle capable of traveling in each of an autonomous self-driving mode, a remote self-driving mode, and a manual driving mode, wherein
  the processor:
    acquires a nearby-vehicle driving mode representing a driving mode of a nearby vehicle that is a vehicle near the host vehicle, and
    in a case in which the nearby vehicle is in front of the host vehicle, in response to determining that the nearby-vehicle driving mode of the nearby vehicle is the remote self-driving mode and the host vehicle is in the remote self-driving mode, outputs, to at least one of a first remote operation terminal that operates the host vehicle, a first control signal relating to a first control restriction that restricts the first remote operation terminal from remotely operating to bring the host vehicle closer to the nearby vehicle when a distance between the host vehicle and the nearby vehicle is less than a predetermined distance, and
    in a case in which the nearby vehicle is behind the host vehicle, in response to determining that the nearby-vehicle driving mode of the nearby vehicle is the remote self-driving mode and the host vehicle is in the remote self-driving mode, outputs, to at least the first remote operation terminal that operates the host vehicle, a second control signal relating to a second control restriction that restricts the first remote operation terminal from remotely operating to decelerate the host vehicle when the distance between the host vehicle and the nearby vehicle is less than the predetermined distance.

7. A non-transitory recording medium in which is stored a vehicle control program that is executable to control a host vehicle configured to travel in each of an autonomous self-driving mode, a remote self-driving mode, and a manual driving mode, the vehicle control program causing a computer to execute a process comprising:

acquiring a nearby-vehicle driving mode representing a driving mode of a nearby vehicle that is a vehicle near the host vehicle, and in a case in which the nearby vehicle is in front of the host vehicle, in response to determining that the nearby vehicle driving mode of the nearby vehicle is the remote self-driving mode and the host vehicle is in the autonomous self-driving mode, controlling travel of the host vehicle in the autonomous self-driving mode to decelerate when a distance between the nearby vehicle and the host vehicle is less than a predetermined distance, and in a case in which the nearby vehicle is behind the host vehicle, in response to determining that the nearby vehicle driving mode of the nearby vehicle is the remote self-driving mode and the host vehicle is in the autonomous self-driving mode, controlling travel of the host vehicle in the autonomous self-driving mode to accelerate when the distance between the nearby vehicle and the host vehicle is less than the predetermined distance.

8. A non-transitory recording medium in which is stored a vehicle control program that is executable to control a host vehicle configured to travel in each of an autonomous self-driving mode, a remote self-driving mode, and a manual driving mode, the vehicle control program causing a computer to execute a process comprising:

acquiring a nearby-vehicle driving mode representing a driving mode of a nearby vehicle that is a vehicle near the host vehicle, and in a case in which the nearby vehicle is in front of the host vehicle, in response to determining that the nearby-vehicle driving mode of the nearby vehicle is the remote self-driving mode and the host vehicle is in the remote self-driving mode, outputting, to at least a first remote operation terminal that operates the host vehicle, a first control signal relating to a first control restriction that restricts the first remote operation terminal from remotely operating to bring the host vehicle closer to the nearby vehicle when a distance between the host vehicle and the nearby vehicle is less than a predetermined distance, and in a case in which the nearby vehicle is behind the host vehicle, in response to determining that the nearby-vehicle driving mode of the nearby vehicle is the remote self-driving mode and the host vehicle is in the remote self-driving mode, outputting, to at least the first remote operation terminal that operates the host vehicle, a second control signal relating to a second control restriction that restricts the first remote operation terminal from remotely operating to decelerate the host vehicle when the distance between the host vehicle and the nearby vehicle is less than the predetermined distance.

\* \* \* \* \*